(12) United States Patent
Gutermuth et al.

(10) Patent No.: US 10,019,687 B2
(45) Date of Patent: Jul. 10, 2018

(54) SYSTEM AND METHOD FOR AUTOMATED HANDLING OF A WORKFLOW IN AN AUTOMATION AND/OR ELECTRICAL ENGINEERING PROJECT

(71) Applicant: ABB TECHNOLOGY AG, Zürich (CH)

(72) Inventors: Georg Gutermuth, Heidelberg (DE); Pablo Rodriguez Carrion, Ilvesheim (DE)

(73) Assignee: ABB Schweiz AG, Baden (CH)

( * ) Notice: Subject to any disclaimer, the term of this patent is extended or adjusted under 35 U.S.C. 154(b) by 821 days.

(21) Appl. No.: 14/446,838

(22) Filed: Jul. 30, 2014

(65) Prior Publication Data
US 2014/0344010 A1 Nov. 20, 2014

Related U.S. Application Data

(63) Continuation of application No. PCT/EP2012/052300, filed on Feb. 10, 2012.

(51) Int. Cl.
*G06Q 10/00* (2012.01)
*G06Q 10/06* (2012.01)
(Continued)

(52) U.S. Cl.
CPC ..... *G06Q 10/0635* (2013.01); *G05B 19/0423* (2013.01); *G06F 3/0484* (2013.01); *G06Q 10/063* (2013.01); *G06Q 10/0633* (2013.01)

(58) Field of Classification Search
CPC .......... G06Q 10/00; G06Q 50/00; G05B 1/00; G05B 24/00
(Continued)

(56) References Cited

U.S. PATENT DOCUMENTS 6,282,526 B1 * 8/2001 Ganesh .............. G05B 13/0275
342/13
7,769,705 B1 8/2010 Luechtefeld
(Continued)

FOREIGN PATENT DOCUMENTS

CN          1958934 A      5/2007
CN      101058319 A    10/2007
(Continued)

OTHER PUBLICATIONS

Singh, Munindar P., and Michael N. Huhns. "Automating workflows for service order processing: Integrating AI and database technologies." IEEE Expert 9.5 (1994): 19-23. (Year: 1994).*
(Continued)

*Primary Examiner* — Alan S Miller
(74) *Attorney, Agent, or Firm* — Barnes & Thornburg LLP (57) ABSTRACT

A system and method are disclosed for automated handling of at least one working step of a workflow in an automation and/or electrical engineering project via a data input interface, a processing unit and a data output interface connected to the processing unit for transmitting any data read in by the data input interface or generated by the processing unit to at least one of a data repository, another processing unit and/or a display unit. The data input interface can read in input values belonging to the at least one working step of the workflow, and an input uncertainty including a range of input values. The processing unit can generate an output value of the working step from the input value, and calculate an output uncertainty characterizing a range of the output value, by taking into account a parameter and/or a technical condition of the working step.

18 Claims, 3 Drawing Sheets

(51) Int. Cl.
*G05B 19/042* (2006.01)
*G06F 3/0484* (2013.01)

(58) Field of Classification Search
USPC .................................................. 705/711–7.42
See application file for complete search history.

(56) References Cited

U.S. PATENT DOCUMENTS

| | | | |
|---|---|---|---|
| 7,904,817 B2* | 3/2011 | Bergantino | G05B 19/0426 700/180 |
| 2004/0102872 A1 | 5/2004 | Schick et al. | |
| 2005/0028073 A1* | 2/2005 | Henry | G06Q 10/10 715/255 |
| 2005/0065837 A1* | 3/2005 | Kosiba | G06Q 10/04 705/7.13 |
| 2006/0129879 A1* | 6/2006 | Alznauer | G06Q 10/10 714/10 |
| 2007/0179742 A1* | 8/2007 | Tabanou | G06Q 10/06 702/181 |
| 2008/0134073 A1* | 6/2008 | Bergantino | G05B 19/0426 715/771 |
| 2010/0292812 A1* | 11/2010 | Wikstrom | G06F 17/50 700/33 |
| 2011/0270646 A1* | 11/2011 | Prasanna | G06Q 10/00 705/7.27 |
| 2013/0290066 A1* | 10/2013 | Altamirano | G06Q 10/0633 705/7.27 |
| 2014/0058798 A1* | 2/2014 | Gottemukkala | G06Q 10/06 705/7.37 |

FOREIGN PATENT DOCUMENTS

| | | |
|---|---|---|
| CN | 101493855 B | 3/2012 |
| CN | 102053570 B | 8/2012 |
| DE | 10 2007 031 696 A1 | 1/2009 |
| JP | 2001339304 | 12/2001 |

OTHER PUBLICATIONS

Vitharana et at., "Knowledge-Based Repository Scheme for Storing and Retrieving Business Components: A Theoretical Design and an Empirical Analysis", IEEE Transactions on Software Engineering, vol. 29, No. 7, pp. 649-664, New York, NY, Jul. 2003._ (Year: 2003).*

Meyer-Wegener et at., "Conceptual Workflow Schemas", Cooperative Information Systems, 1999 IFCIS International Conference, IEEE Computer Society, Sep. 2, 1999, pp. 234-242. (Year: 1999).*

International Search Report (PCT/ISA/210) dated Nov. 12, 2012, by the European Patent Office as the International Searching Authority for International Application No. PCT/EP2012/052300.

* cited by examiner

SYSTEM AND METHOD FOR AUTOMATED HANDLING OF A WORKFLOW IN AN AUTOMATION AND/OR ELECTRICAL ENGINEERING PROJECT

RELATED APPLICATION(S)

This application claims priority as a continuation application under 35 U.S.C. § 120 to PCT/EP2012/052300 filed as an International Application on Feb. 10, 2012 designating the U.S., the entire content of which is hereby incorporated by reference in its entirety.

FIELD

The disclosure relates to a system for automated handling of at least one working step of a workflow in an automation and/or electrical engineering project, where the system can include a data input interface for reading in at least one input value belonging to the at least one working step of the workflow of the project, a processing unit connected to the user interface for generating at least one output value from the at least one input value, where the at least one output value represents a result of the at least one working step, and a data output interface connected to the processing unit for transmitting any data read in by the data input interface or generated by the processing unit to at least one of a data repository, another processing unit and/or a display unit.

BACKGROUND INFORMATION

Automation projects or electrical engineering projects can be projects which can be aimed at bidding, planning, designing, installation, commissioning and servicing of technical installations or systems for automating and/or supplying power to a technical process or facility, where the technical installation or system can be for example a process automation system for a factory or a control system for a power plant or a power supply system for a building complex.

Such a project can undergo various phases, which can occur subsequently or in parallel, such as tendering, collection of specifications or requirements, planning of information signals, planning of power cabling and/or communication networks, engineering of control logic, configuration of human machine interfaces (HMIs) and system integration. The phases themselves can again be divided into a certain number of working steps. A working step can include at least one activity which generates at least one output information and/or at least one physical result. Inside a workflow of a project, the at least one output information and/or physical can result represent at least one input information and/or prerequisite for a subsequent working step, respectively. Examples for working steps can be the planning of cross controller communication during the planning of information signals, the designing of process graphics during the configuration of HMIs, the implementation of sequence control logics during the control logic engineering or the parameterization of controllers during system integration and sub-parts of these activities.

Currently, it would be desirable to perform at least some working steps automatically by computer tools. Examples for currently known automated working steps can be the configuration of devices based on templates, the auto-generation of control code for I/O boards and the auto-generation of order requests based on material lists. It would be further desirable that more and more of these computer tools can be enabled to communicate with each other so that not only a single working step but a whole sequence of working steps can be performed automatically.

During execution of the phases and their corresponding working steps, a considerable number of different professions, different computer tools and different types of information have to go hand in hand and need to be coordinated in order to ensure that the resulting technical installation or system functions properly. For example, some working steps cannot be performed before other working steps can be successfully finished or before certain input information is available.

Figure 3:
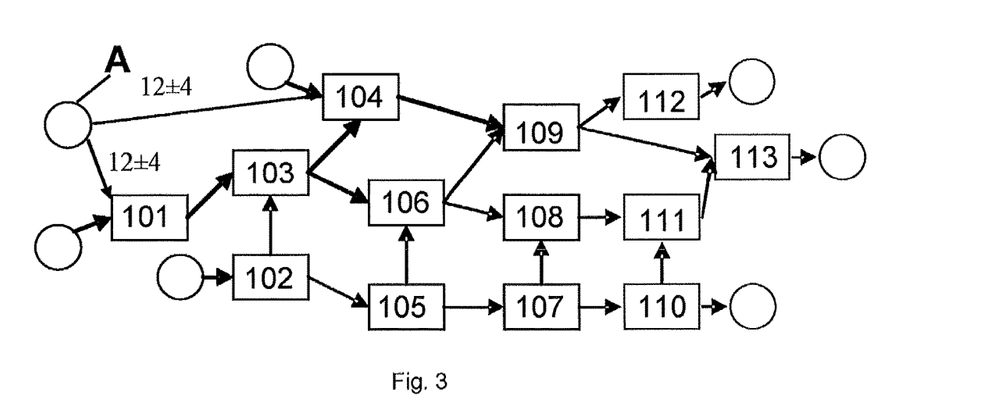
FIG. 3 shows an example of a project workflow.

These interrelations between working steps can be visualized by a workflow diagram, such as depicted in FIG. 3, where the numbered rectangles 101 to 113 each represent a working step. The four input circles on the left hand side illustrate external inputs which can be involved in performing the working steps 101, 102 and 104 connected by arrows to the input circles. Working steps 101 and 104 each receive two external inputs. On the right hand side, the external outputs generated by the working steps 110, 112 and 113 can be depicted by three output circles connected again by arrows to the corresponding working steps. Working steps 103, 105 to 109 and 111 only have internal input and output connections (e.g., they receive their inputs from one or more preceding working steps of the workflow and deliver their outputs to one or more subsequent working steps of the workflow).

Inputs to and outputs from working steps can be on the one hand data, information or decisions and on the other hand physical objects, such as documents, tools or installed equipment, no matter whether they can be external or internal inputs or outputs.

Figure 1:
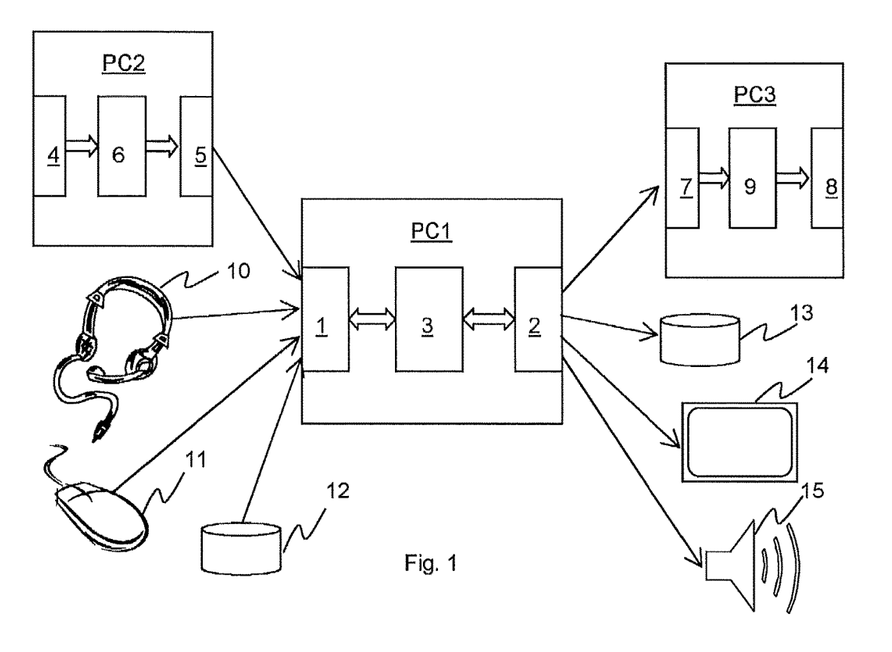
FIG. 1 shows an exemplary system for executing working steps of a project.

At least some of the working steps of FIG. 3 can be performed automatically by using a system as shown in FIG. 1. A first computing device PC1 contains a data input interface 1 for reading in input information of a working step, where the input information is delivered by either a second computing device PC2, which can have performed one or more preceding working steps, by a first data repository 12 located for example on a central data server, or by interaction with a user via for example an acoustic input device 10, a pointing device 11 and/or a keyboard. The input information is represented by one or more input values, where the input values can, for example, be constants or variables, predefined or continuously changing and where the input values can be given directly as numbers or in text form which is later transformed into numbers. The first computing device PC1 further can include a processing unit 3 for generating the output information of the working step by processing the input information during performance of a predefined task allocated to the working step, and a data output interface 2 for transmitting input as well as output information to further devices for further processing and/or data storage and/or acoustic or graphic visualization. The further devices can, for example, be a third computing device PC3 which is arranged for performing subsequent working steps, a second data repository 13 which can be located on the same central data server as the first data repository 12 or on another storage device, a graphic display unit 14 or an acoustic display unit 15. The output information is represented by one or more output values, which again can be constants or variables and can be given in text form or directly as numbers. The second and third computing devices, PC2 and PC3, both can contain the same components as the first computing device PC1 (e.g., a data input interface 4 or 7, a processing unit 6 or 9 and a data output interface 5 or 8, respectively).

As becomes clear from FIG. 3, a workflow of an automation and/or electrical engineering project can contain a considerable number of closely meshed working steps where each working step can only be performed when all specified inputs can be available and where a change in one external input or in the output of a preceding working step can affect a comparatively large number of subsequent working steps.

In actual execution of automation and/or electrical engineering projects, the collection of specified input information can be a cumbersome task and can lead to delays. In addition, facts and data as well as the physical environment of a project may not be static, which can lead to frequent changes. These changes can result in further delays because a number of already finished working steps have to be performed again.

SUMMARY

A system for automated handling of at least one working step of a workflow in an automation and/or electrical engineering project is disclosed comprising: a data input interface for reading in at least one input value belonging to at least one working step of a workflow of a project; a processing unit connected to the data input interface for generating at least one output value from the at least one input value, where the at least one output value represents a result of the at least one working step; a data output interface connected to the processing unit for transmitting any data read in by the data input interface or generated by the processing unit to at least one of a data repository, another processing unit and/or a display unit; wherein the data input interface is configured to read in at least one input uncertainty characterizing a range of the input value; and the processing unit is configured to calculate from the at least one input value and the at least one input uncertainty at least one output uncertainty characterizing a possible or allowed range of the output value of the at least one working step, by taking into account a parameter and/or a technical condition of the working step.

A method for handling automatically a workflow in an automation and/or electrical engineering project is disclosed comprising: reading in at least one input value belonging to at least one working step of the workflow of the project; generating at least one output value from the at least one input value, where the at least one output value represents a result of the at least one working step; transmitting data which was read in or generated to at least one of a data repository, another processing unit and/or a display unit; reading in at least one input uncertainty characterizing a range of the input value; and calculating from the at least one input value and the at least one input uncertainty at least one output uncertainty characterizing a range of the output value of the at least one working step, by taking into account a parameter and/or a technical condition of the working step.

BRIEF DESCRIPTION OF THE DRAWINGS

Features of the disclosure and various embodiments will become apparent from the examples described below in connection with the appended drawings, wherein:

FIG. 6 a, b show an example for how a result generated by a processing unit and transmitted via a data output interface to a graphical display unit can be visualized.

DETAILED DESCRIPTION

A system and method are disclosed for automated handling of at least one working step of a workflow in an automation and/or electrical engineering project with which the above named side effects of input collection and changes during project execution can be reduced.

In an exemplary system according to the disclosure, the data input interface is arranged (i.e., configured) to read in at least one input uncertainty characterizing a possible or allowed range of the input value, the processing unit is arranged to calculate from the at least one input value and the at least one input uncertainty at least one output uncertainty characterizing a possible or allowed range of the output value of the at least one working step, by taking into account a parameter and/or a technical condition of the working step As already described, the term working step is used for at least one activity performed during the execution of the project, where the at least one activity generates at least one output information. The at least one output information is, for example, an indication of a quantity, where the quantity can for example be given as number of devices or number of communication signals, or as a length of cable or size of a cabinet. In an exemplary alternative, the output information can also be given as an indication for a specific type of equipment which can be selected from various choices, for example a specific type of field bus, controller device, signal transmission protocol or software tool to be used.

Parameters or technical conditions of the working step can, for example, be those parameters and conditions which have the highest influence on the magnitude of the output uncertainty. For example, a certain type of technical equipment can be specified to be able to handle a predefined optimum amount of a physical entity during normal operating conditions and up to a maximum or down to a minimum of this physical entity connected with a degradation in the operating conditions (e.g., only during a shorter period of time or at the cost of operational speed etc.). When this certain type of technical equipment plays a role during a working step (e.g., when the processing unit has the task to determine how many devices of this technical equipment can be needed to handle an uncertain amount of the physical entity), the above named specification can be taken into account by the processing unit in order to evaluate whether the input uncertainty can be handled by the specific number of devices without By allowing for input values to be accompanied by a corresponding uncertainty value and by taking the uncertainty into account when performing the task allocated to the working step so that the output value or values can be generated together with an uncertainty value as well, it becomes possible to execute or perform working steps even when not all of the specified input information is available. In such cases, input values can be created from available knowledge, such as estimations or heuristics or experiences from previous projects which can be laid down in formulas or tables.

An example from the field of automation and/or electrical engineering projects, is the external input information about the number of information signals to be transmitted inside the technical installation or system. When this number cannot be given exactly but at least with an uncertainty value lying within a reasonable limit, i.e. 5000 information signals with 5% uncertainty, it becomes possible to plan already the number of specified computer servers and/or controller devices without having to fear that these numbers will have to be corrected. Accordingly, the working step of planning the computer and/or control equipment can be performed earlier, even when not all external input information is present, resulting in a saving of time.

A further example for a working step requiring external input values is the planning of storage capacity for an information management system belonging to the technical installation or system. External input values can be the number, type and sample frequencies of the data signals to be stored in for example a historian server of the information management system. When upper and lower boundaries of these input values are known, estimations for the required storage capacity can be made early in the project which can then allow for an iterative adjustment of the desired number and sample frequency.

Subsequent working steps can also be performed without having all external input values available exactly, because the subsequent working steps receive as their input values the output values of the preceding working step or steps together with the corresponding output uncertainties which become the new input uncertainties.

For some of the subsequent working steps the uncertainty cannot influence their outputs at all, as long as the output uncertainty of the preceding working step lies within certain limits. An example for such a preceding working step in an automation and/or electrical engineering project is the planning of cross controller communication (e.g., of signal communication between controller devices). An output value is the figure for the expected number of signals to be communicated between controller devices. Even if this figure can be generated only as an approximation (e.g., as an output value with corresponding output uncertainty), this can be sufficient to design, in a subsequent working step, the topology of the communications network. A re-design of the network topology will in most cases not be necessary after the exact figure becomes available, because one and the same network topology can be applicable for a wide range of actual communication implementations. In this way, time can again be saved, because more working steps can be performed in parallel even if preceding working steps are not absolutely complete or if specified input information is not yet available with absolute certainty.

Not only single working steps can be performed earlier due to taking into account uncertainties, also whole phases of automation and/or electrical engineering projects can be performed completely allowing for the execution of subsequent phases. For example, the planning of power cabling can generate a preliminary figure for the expected length of power cable for a subsequent equipment installation phase, where this preliminary figure is again accompanied by an uncertainty value. Even though this figure is not yet exact, it gives the possibility to at least order a minimum length of power cable so that the subsequent installation phase can begin much earlier compared to waiting until the input information is complete. On the other hand, if the common approach was to order a generous quantity of material and equipment in order to be prepared for changes, the disclosure allows for limiting this quantity in accordance with the maximum quantity given by the output uncertainty. This results in a reduction of hardware costs of the project.

As was mentioned, the decision about whether a working step can be performed despite its input values being not exact depends on the value of the respective uncertainties. If a given uncertainty exceeds a reasonable limit, for example becomes larger than 30% of the corresponding input value, it can be more suitable to wait until the uncertainty decreases below this limit or until the exact input information is available. Accordingly, the disclosure provides an additional means to automatically manage the timely execution of the project, where the uncertainty information helps in taking a reasoned decision about which working step is to be performed when.

A further exemplary advantage of the disclosure is that a change in an external input value as well as in a parameter or a technical condition of a working step does not automatically result in the re-performing of all subsequent working steps. The change in the parameter or technical condition leads to a change in the output uncertainty of the working step. For those working steps which can be subsequent to the changed external input value or changed output uncertainty it can be checked simply, whether the change falls within the input uncertainty range which was considered earlier when performing the respective subsequent working step at an earlier point in time, and whether at this earlier point in time the determined output uncertainty of the subsequent working step was zero or not. A zero output uncertainty indicates that as long as the input uncertainty range is not exceeded, the output value of the subsequent working step remains unchanged (e.g., for such a subsequent working step an update is not required). Accordingly, change requests in the automation and/or electrical engineering project can be processed and executed with less effort due to the disclosure.

An example for an unnecessary update of a working step is the planning of controller cabinets (e.g., of the housings within which the controller devices are to be installed). Input values to the working step can be, for example, the number and type of controllers and the number and type of information signals. Output values can be the number as well as the size and thereby the capacity of the controller cabinets. These can be planned so that a certain amount of empty space is left inside the cabinets in accordance with the upper limit of the input uncertainty corresponding to at least one of the input values. As long as this input value remains below its upper limit, changes in the input value do not affect the output values so that the working step of planning of controller cabinets needs to be performed only once.

An exemplary method according to the disclosure can contain all described steps performed by one of the elements of the system (e.g., by the data input interface, the processing unit and the data output interface).

In an exemplary embodiment of the disclosure, the workflow can contain at least two working steps, the at least one output value represents an input value of at least one of the at least two working steps and each of the at least two working steps is defined to generate at least one corresponding output value, and where the processing unit is arranged to predict whether the at least one input uncertainty propagates through the at least two working steps of the workflow or not.

In other words, the processing unit can be arranged to check whether an input uncertainty influences the output variable or variables of working steps having this input uncertainty assigned to one of their input values (e.g., whether the output variables can also be given with upper and lower boundaries only). The processing unit performs this checking working step for working step following the logical sequence of the workflow until the output uncertainties will be zero. During this checking, the working steps themselves are not executed. Instead, the processing unit predicts the propagation of the input uncertainty using one or more of look-up tables, heuristics, formulas, neural networks or fuzzy logic. The quantitative statement generated as a result of this embodiment can be provided by the processing unit via the data output interface to a reasoning engine where it is decided whether some of the working steps of the workflow can be started to be executed. These working steps will for example be those working steps which can be unaffected by the input uncertainty.

An exemplary embodiment can be further extended by arranging the processing unit to be able to predict the extent to which the at least one input uncertainty propagates through the at least two working steps of the workflow by calculating a corresponding output uncertainty for each of the at least two working steps, where again the already named methods can be used. Instead of a qualitative statement, a quantitative statement can be generated which can help to decide for which working steps of the workflow the corresponding input uncertainties can be small enough to start performing. In this way, more working steps can be executed at an earlier point in time compared to the generation of a mere qualitative statement of the propagation of the input uncertainty.

The processing unit can also be arranged to predict whether and/or to which extent a change in the at least one input variable propagates through at least two working steps of the workflow by comparing the changed input variable with the previously given input uncertainty and/or by predicting a change in the output values of each of the at least two working steps. Those changed output values which form input values of at least one of the at least two working steps can be also compared to the previously determined input uncertainties. In those cases, where the changed input values do not exceed their corresponding previously given input uncertainty, the processing unit sends a message to the data output interface stating that the change does not affect these working steps (e.g., that they do not need to be re-performed).

The processing unit can further be arranged to evaluate whether and/or to which extent the propagation of the change through the at least two working steps results in at least one of the output values of the at least two working steps to exceed their corresponding output uncertainty which was calculated before the change. The result reflects an increased effort caused by the change because the extension of an output uncertainty means that all subsequent working steps have definitely to be re-performed. A reasoning engine can then decide whether the increased effort is acceptable with respect to predefined project constraints or not (e.g., whether the change request can be accepted or not).

In those cases where the change in the at least one input variable is due to a changed request by the customer of the project and where the processing unit predicts that output values are definitely changing, a report about the implications of the change request can be generated automatically, either by the processing unit or by an external device connected via the data output interface. The changed request can for example result in a reduced amount of specified material or equipment, where the material or equipment can have already been ordered based on previously planned numbers. The report can then reflect both the undesired surplus in material and equipment as well as the increased effort for the project execution. This report can form then a basis for further decisions to be taken together with the customer.

The data input interface can further be arranged to read in at least one limitation value which characterizes a possible or allowed range of at least one predefined output value and where the processing unit is arranged to check whether the output value including its corresponding output uncertainty falls within the range defined by the at least one limitation value or not. A limitation value can reflect a constraint on the automation and/or electrical engineering project or a possible fluctuation of the output value known from experience. The processing unit is therefore arranged to provide decision support on the quality of the output value by being arranged to check whether the limitation value is exceeded or not.

Even further, the processing unit can be arranged to combine the at least one output uncertainty with an external output uncertainty of another automation and/or electrical engineering project in order to calculate a number of hardware components which is required to be held in stock, where the number of hardware components is less than the sum of the at least one output uncertainty and the external output uncertainty.

For example, for three different projects it can have been determined that each project needs to install 10±3 controller devices. Regarding each project separately, it can be advisable to have 3 controller devices on stock to save time in case that indeed all of the maximum 13 controller devices can be needed. However, when all three projects can be executed in parallel, it is not necessary to have a total of 9 controller devices on stock. Instead a lesser number, for example 5, can be sufficient and reduce the overall costs.

As already described, the processing unit can be arranged to transmit its processing results to the data output interface from where they can be transmitted to further devices units. One of these further units can be a reasoning engine which can derive information needed to take decisions with respect to the execution of the project. It is also possible to arrange the processing unit itself for determining, based on the at least one input and/or output uncertainty, the risk for a successful execution of the project.

The data input interface can be connected to a user interface, which can be a visual, acoustic and/or haptic interface, where the user interface is arranged to query a user for inputting the at least one input uncertainty.

In order to support a user in performing the at least one working step or in taking decision for subsequent working steps, the processing unit can be arranged to generate a visual and/or acoustic representation, such as a color code, a graphical marking or symbol, an animation, a sound etc., of at least one of its processing results.

FIGS. 1 and 3, as already described, illustrate a state of the art.

Figure 2:
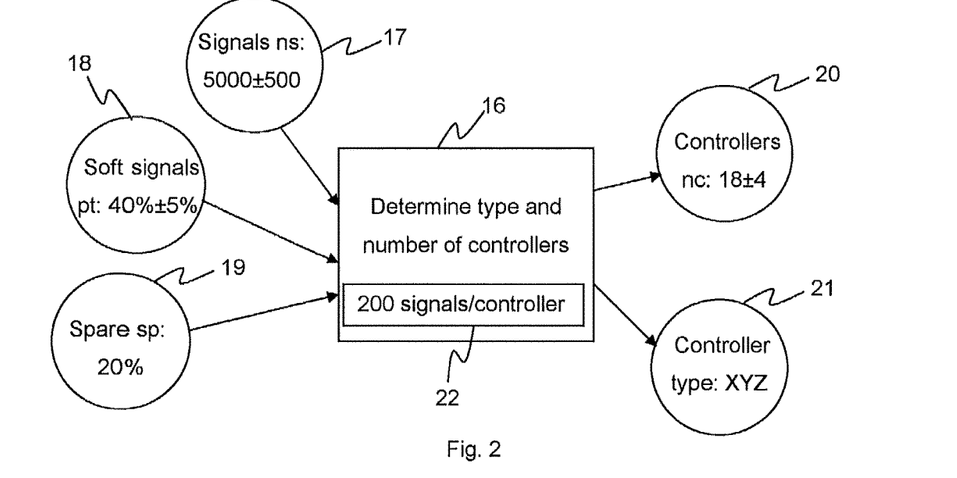
FIG. 2 shows one exemplary working step with input and output values.

An example of a working step 16 which is performed in accordance with the disclosure is shown in FIG. 2, where the task assigned to the working step 16 is the determination of the type and number of controller devices. Exemplary input values and corresponding input uncertainties 17 to 19 are the following:

the number of information signals (ns)17 to be transmitted is, based on an uncertainty $u_{ns}$, for example: $ns \pm u_{ns} = 5000 \pm 500$, the percentage of these information signals 18 which can be transmitted ($u_{pt}$) via one and the same signal transmission path (e.g., cable) is, based on an uncertainty $u_{pt}$ for example: pt±$u_{pt}$=40%±5%, the desired spare capacity 19 for the handling of signals per controller is for example: sc=20%.

Further, a technical condition or parameter 22 can be given for the working step which states that up to nc=200 information signals can be handled per controller device of type xyz.

As already described, the input values and uncertainties 17 to 19 can be read in via data interface unit 1. The same is true for the technical condition or parameter 22 which may have been read in at an earlier point in time as a predefined value for the working step 16. These data can be processed by processing unit 2 in order to determine the output value 20 and 21, the output values being the number nc of controller devices and their corresponding type xyz, where the output value nc is accompanied by a corresponding output uncertainty u_nc with an upper limit u_nc,up and a lower limit u_nc,low. The processing can, for example, be based on the following formulas:

$$nc = \frac{1}{pc} \cdot ns \cdot \left(1 - \frac{pt}{100}\right) \cdot \left(1 + \frac{sc}{100}\right) = 18,$$

$$u_{nc,up} = \frac{1}{pc} \cdot (ns + u_{ns}) \cdot \left(1 - \frac{pt - u_{pt}}{100}\right) \cdot \left(1 + \frac{sc}{100}\right) = 21,45 \approx 21,$$

$$u_{nc,low} = \frac{1}{pc} \cdot (ns + u_{ns}) \cdot \left(1 - \frac{pt - u_{pt}}{100}\right) \cdot \left(1 + \frac{sc}{100}\right) = 14,85 \approx 15.$$

A resulting number of controllers (nc) can be therefore estimated based on an uncertainty $u_{nc}$ to be: nc±$u_{nc}$=18±3.

In addition to what is shown in FIG. 2, the technical condition or parameter 22 can be given with an uncertainty as well, for example as nc=200±60, where this uncertainty is also taken into account by the processing unit 2 when generating the output uncertainty $u_{nc}$.

Figure 4:
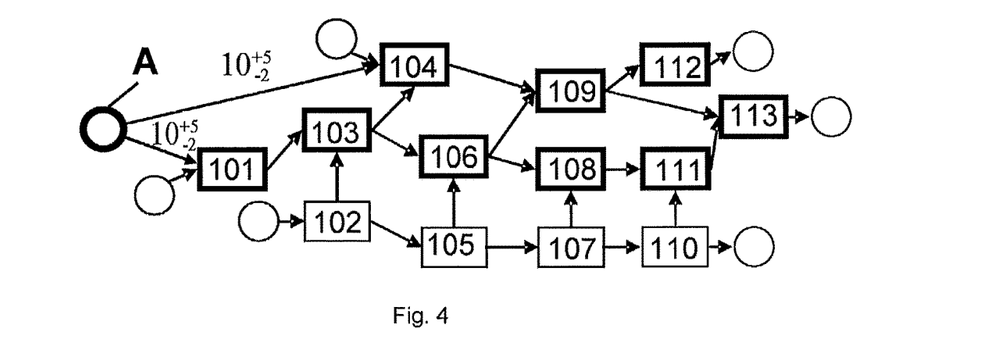
FIG. 4 shows exemplary working steps of FIG. 3 which can be theoretically affected by a change in an external input value.

FIG. 4 shows the same workflow as already described with respect to FIG. 3. When external input value A is changed from 12±4 to $10_{-2}^{+5}$, all working steps receiving this input value directly (e.g., working steps 101 and 104), can be re-performed when no uncertainties were taken into account during performance of these working steps before the change. The same is true for all working steps which are subsequent to working steps 101 and 104, (e.g., working steps 103, 106, 108, 109, 111, 112 and 113). In total, nine working steps can be re-performed.

Figure 5:
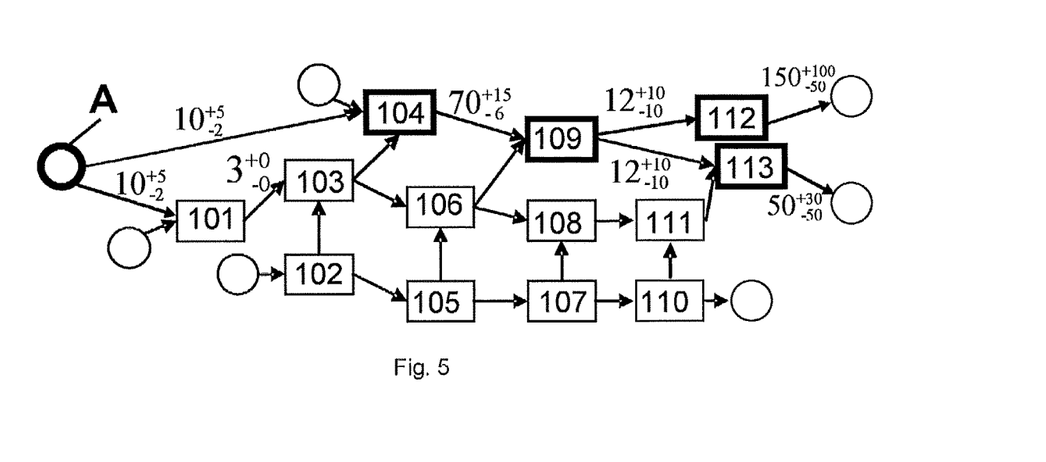
FIG. 5 shows exemplary working steps of FIG. 3 which can be practically affected by a change of FIG. 4 according to the disclosure.

As an exemplary result and advantageous effect of the disclosure, this number can be considerably reduced. As is indicated in FIG. 5 in comparison to FIG. 3, the output value of working step 101 can be certain (e.g., 3), as long as the input value A does not exceed the previously considered upper limit of 16 and lower limit of 8. Because the changed input value A is still within this range, working step 101 does not need to be re-performed. And because the output value of working step 101 remains unchanged also the subsequent working steps 103, 106, 108 and 111 do not have to be executed again. This reduces the number of working steps to be repeated to 4 (e.g., working steps 104, 109, 112 and 113), which means a considerable saving of project execution time.

Figure 6A:
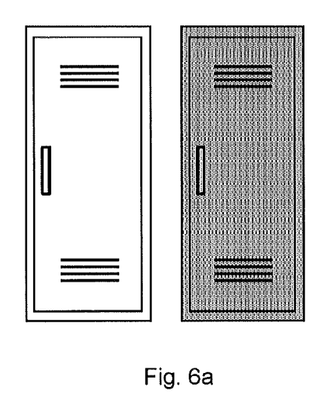
Figure 6B:
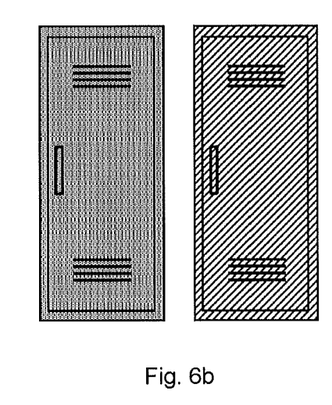

FIGS. 6a and 6b show an example for how a result generated by processing unit 3 and transmitted via data output interface 2 to graphical display unit 14 can be visualized.

In FIG. 6a, two controller cabinets can be shown where their number and contents correspond to output values of different working steps. The color or color pattern, respectively, of the cabinet indicates whether these output values fall within the range of corresponding predefined limit values (e.g., a predefined project constraint), or not. The cabinet to the left is white, indicating the all output values fall within the range, while the cabinet to the right is gray, indicating that at least one of the output values is getting close to its corresponding limit value. This gives an information to a user or decision maker that the project execution can still be continued but that it is getting close to a risk zone.

FIG. 6b shows the same two cabinets after a next working steps of the project was executed. The cabinet to the left turned gray, because at least one of the newly generated or updated output values is now being close to its limit value. This color change in color gives a helpful information to for example the engineer who supervised the performing of the last working step that something in the working step should be optimized. This could for example be parameters of the working step or the formulas used. If no improvement is possible there, the color change of the cabinet can be taken as an indicator for a possibly necessary request to change external input values of the project.

The cabinet to the right in FIG. 6b is visualized with a striped pattern, indicating that at least one of the limit values is exceeded by the newly generated or updated output values. Accordingly, the project is at risk and a decision should be made for how to bring the project execution back into the safety zone. This decision can be taken automatically by a reasoning engine, or the reasoning engine could process all available project information in order to make a proposal to a human operator for how the project and in particular its external input values or its constraints, like time or costs, need to be changed in order to be able to guarantee success of the project again.

Figure 7:
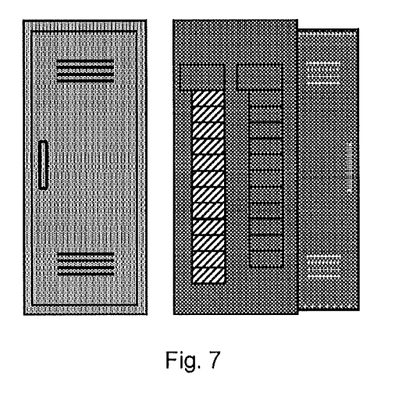
FIG. 7 shows an example similar to FIG. 6 b to illustrate a cabinet to the right in its opened state.

FIG. 7 differs from FIG. 6b only in that the cabinet to the right is illustrated in its opened state, showing two rows of control input/output boards (I/O boards). The left hand row is depicted with the striped pattern in order to clarify that this is the part of the cabinet where one or more limit values, for example the maximum allowed number of I/O boards, is exceeded. This simplifies the task for the decision making instance to find the project part where changes or adjustments need to be made in order to fall back into the limit value range.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for automated handling of at least one working step of a workflow in an automation and/or electrical engineering project, the system comprising:

a data input interface for reading in at least one input value belonging to at least one working step of a workflow of a project;

a processing unit connected to the data input interface for generating at least one output value from the at least one input value, where the at least one output value represents a result of the at least one working step; and a data output interface connected to the processing unit for transmitting any data read in by the data input interface or generated by the processing unit to at least one of a data repository, another processing unit and/or a display unit;

wherein the data input interface is configured to read in at least one input uncertainty characterizing a range of the input value; and wherein the processing unit is configured to (i) calculate from the at least one input value and the at least one input uncertainty at least one output uncertainty characterizing a possible or allowed range of the output value of the at least one working step, by taking into account a parameter and/or a technical condition of the working step, (ii) an external output uncertainty of another automation and/or electrical engineering project combine the at least one output uncertainty with an external output uncertainty of another automation and/or electrical engineering project to calculate a number of hardware components to be held in stock, where the number of hardware components is less than a sum of the at least one output uncertainty and the external output uncertainty, and (iii) automatically generate an order request for the hardware components based on the calculated number of hardware components to be held in stock.

2. The system according to claim 1, wherein the data input interface is configured to read in the at least one input uncertainty, and the processing unit is configured to generate the output uncertainty as one of an absolute quantity, a relative quantity with respect to the input value or a list of alternatives.

3. The system according to claim 1, wherein the processing unit is configured to calculate the at least one output uncertainty using at least one of estimation algorithms, heuristics, tables or formulas.

4. The system according to claim 1, wherein the workflow contains at least two working steps, the processing unit being configured to generate at least one output value which represents an input value of at least one subsequent working step with each working step being defined to generate at least one corresponding output value, and where the processing unit is configured to predict whether the at least one input uncertainty will propagate through the at least two working steps of the workflow or not.

5. The system according to claim 4, wherein the processing unit is configured to predict an extent to which the at least one input uncertainty will propagate through the at least two working steps of the workflow by calculating a corresponding output uncertainty for each of the at least two working steps.

6. The system according to claim 4, wherein the processing unit is configured to predict whether and/or to which extent a change in the at least one input variable will propagate through at least two working steps of the workflow by comparing a changed input variable with a previously given input uncertainty and/or by predicting a change in output values of each of the at least two working steps.

7. The system according to claim 4, wherein the processing unit is configured to evaluate whether and/or to which extent the propagation of the change through the at least two working steps will result in at least one of the output values of the at least two working steps exceeding their corresponding output uncertainty which was calculated before the change.

8. The system according to claim 1, wherein the data input interface is configured to read in at least one limitation value which defines a possible or allowed range of at least one predefined output value, and wherein the processing unit is configured to check whether the output value including its corresponding output uncertainty falls within the range defined by the at least one limitation value or not.

9. The system according to claim 1, wherein the processing unit is configured to determine, based on the at least one input and/or output uncertainty, a risk for successful execution of the project.

10. The system according to claim 1, further comprising:
a user interface, where the data input interface is connected to the user interface to query a user for inputting the at least one input uncertainty.

11. The system according to claim 1, wherein the processing unit is configured to generate a visual representation of at least one of its processing results.

12. A method for handling automatically a workflow in an automation and/or electrical engineering project, the method comprising:
reading in at least one input value belonging to at least one working step of the workflow of the project;
generating at least one output value from the at least one input value, where the at least one output value represents a result of the at least one working step;
transmitting data which was read in or generated to at least one of a data repository, another processing unit, and/or a display unit;
reading in at least one input uncertainty characterizing a range of the input value;
calculating from the at least one input value and the at least one input uncertainty at least one output uncertainty characterizing a range of the output value of the at least one working step, by taking into account a parameter and/or a technical condition of the working step;
combining the at least one output uncertainty with an external output uncertainty of another automation and/or electrical engineering project to calculate a number of hardware components to be held in stock, where the number of hardware components is less than a sum of the at least one output uncertainty and the external output uncertainty; and
automatically generating an order request for the hardware components based on the calculated number of hardware components to be held in stock.

13. The method according to claim 12, further comprising:
generating the output uncertainty as one of an absolute quantity, a relative quantity with respect to the input value, or a list of alternatives.

14. The method according to claim 12, further comprising:
calculating the at least one output uncertainty using at least one of estimation algorithms, heuristics, tables or formulas.

15. The method according to claim 12, wherein the workflow contains at least two working steps, and the at least one output value represents an input value of at least one subsequent working step with each working step being defined to generate at least one corresponding output value, and the method comprising: predicting whether the at least one input uncertainty will propagate through the at least two working steps of the workflow or not.

16. The method according to claim 15, further comprising: predicting an extent to which the at least one input uncertainty will propagate through the at least two working steps of the workflow by calculating a corresponding output uncertainty for each of the at least two working steps.

17. The method according to claim 15, further comprising: predicting whether and/or to which extent a change in the at least one input variable will propagate through at least two working steps of the workflow by comparing a changed input variable with a previously given input uncertainty and/or by predicting a change in output values of each of the at least two working steps.

18. The method according to claim 15, further comprising: evaluating whether and/or to which extent the propagation of the change through the at least two working steps will result in at least one of the output values of the at least two working steps exceeding their corresponding output uncertainty which was calculated before the change.

* * * * *